(12) United States Patent
Kwon et al.

(10) Patent No.: US 12,377,904 B2
(45) Date of Patent: Aug. 5, 2025

(54) STEER BY WIRE TYPE STEERING APPARATUS

(71) Applicant: HL MANDO CORPORATION, Pyeongtaek-si (KR)

(72) Inventors: HyunBi Kwon, Gyeonggi-do (KR); SeungWoo Cheon, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 600 days.

(21) Appl. No.: 17/865,916

(22) Filed: Jul. 15, 2022

(65) Prior Publication Data

US 2023/0021499 A1    Jan. 26, 2023

(30) Foreign Application Priority Data

Jul. 20, 2021   (KR) .......................... 10-2021-0095048

(51) Int. Cl.
*B62D 5/00* (2006.01)
(52) U.S. Cl.
CPC .................. *B62D 5/001* (2013.01)

(58) Field of Classification Search
CPC ...................................... B62D 5/001
See application file for complete search history.

(56) References Cited

U.S. PATENT DOCUMENTS

| | | | |
|---|---|---|---|
| 11,332,182 B2* | 5/2022 | Ishimura | B62D 5/005 |
| 12,252,186 B2* | 3/2025 | Lee | B62D 5/001 |
| 2024/0294206 A1* | 9/2024 | Kim | B62D 5/0421 |

* cited by examiner

Primary Examiner — Kevin Hurley
(74) Attorney, Agent, or Firm — WOMBLE BOND DICKINSON (US) LLP

(57) ABSTRACT

A steer by wire type steering apparatus comprises a first guide member formed in an axial shape, a second guide member coupled to or integrally formed with the first guide member and having a helical guide groove that gradually decreases in diameter from the outer periphery to the center, a housing in which the first guide member and the second guide member are built in, and a radial slot is formed in a portion facing the guide groove, and a moving member having one end supported by the slot and the other end supported by the guide groove and radially moving along the slot.

20 Claims, 12 Drawing Sheets

STEER BY WIRE TYPE STEERING APPARATUS

CROSS REFERENCE TO RELATED APPLICATION

This application claims the benefit and priority from Korean Patent Application No. 10-2021-0095048, filed in the Republic of Korea on Jul. 20, 2021, the entire contents of which are hereby incorporated by reference for all purposes as if fully set forth into the present application.

BACKGROUND

Technical Field

Embodiments of the present disclosure relate to a steer by wire type steering apparatus, and more particularly, to a steer by wire type steering apparatus capable of mechanically stopping the steering wheel from rotating further when the rotation of the vehicle wheel reaches its maximum point.

Description of the Related Art

In general, power steering has been developed and applied to a vehicle steering apparatus to provide convenience in driving operation by assisting a driver's operating force of a steering wheel. Power steering was developed and applied in hydraulic type using hydraulic pressure, electro-hydraulic type using hydraulic pressure and electric power of the motor at the same time, and electric type using only electric power of the motor.

Recently, instead of removing a mechanical connection device such as a steering column or a universal joint or a pinion shaft between the steering wheel and the vehicle wheel, the Steer By Wire (SBW) type steering apparatus for steering a vehicle using an electric motor has been developed and applied.

However, in the case of such a steer by wire type steering system, since there is no mechanical connection between the steering shaft and the vehicle wheels, the driver's steering wheel rotation can rotate indefinitely, thereby reducing the driver's steering feeling and steering stability.

In addition, in the steer by wire type steering apparatus, when a malfunction or inability of a motor or an electronic control device occurs, a steering reaction force cannot be generated, thereby deteriorating the driver's steering feel and steering stability.

Therefore, when the rotation of the vehicle wheel reaches its maximum point (when the steering wheel or the vehicle wheel is in a full-turn state in a general steering system), there is a need for research to prevent the steering wheel from rotating any more.

SUMMARY

[ ] Embodiments of the present disclosure provide a steer by wire type steering apparatus capable of increasing a driver's steering feel and steering stability by preventing the steering wheel from mechanically rotating anymore when the rotation of the vehicle wheel reaches the maximum point.

In addition, the purpose of the embodiments of the present disclosure are not limited thereto, and other objects not mentioned will be clearly understood by those skilled in the art from the following description.

A steer by wire type steering apparatus according to the embodiments of the present disclosure may comprise a first guide member formed in an axial shape, a second guide member coupled to or integrally formed with the first guide member and having a helical guide groove that gradually decreases in diameter from the outer periphery to the center, a housing in which the first guide member and the second guide member are built in, and a radial slot is formed in a portion facing the guide groove, and a moving member having one end supported by the slot and the other end supported by the guide groove and radially moving along the slot.

According to the embodiments of the present disclosure, there is provided a steer by wire type steering apparatus that increases a driver's steering feel and steering safety by preventing the steering wheel from mechanically rotating any more when the rotation of the vehicle wheel reaches the maximum point.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
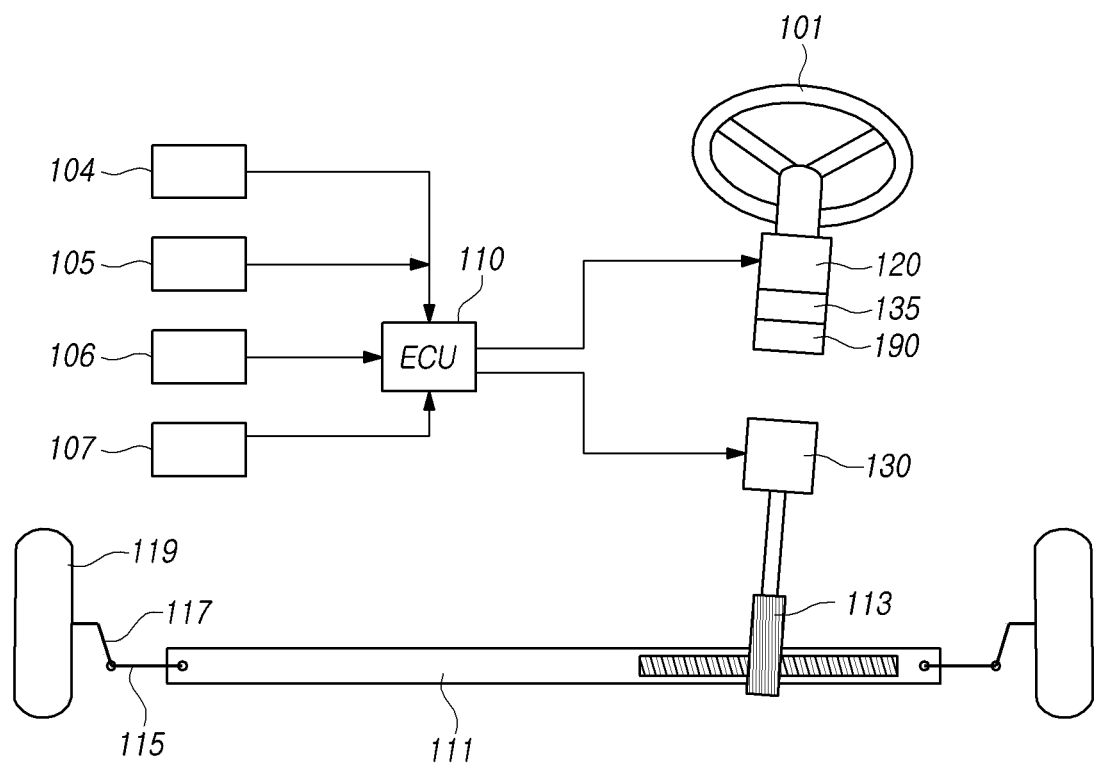
FIG. 1 is a schematic view illustrating a steer by wire type steering apparatus according to the embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
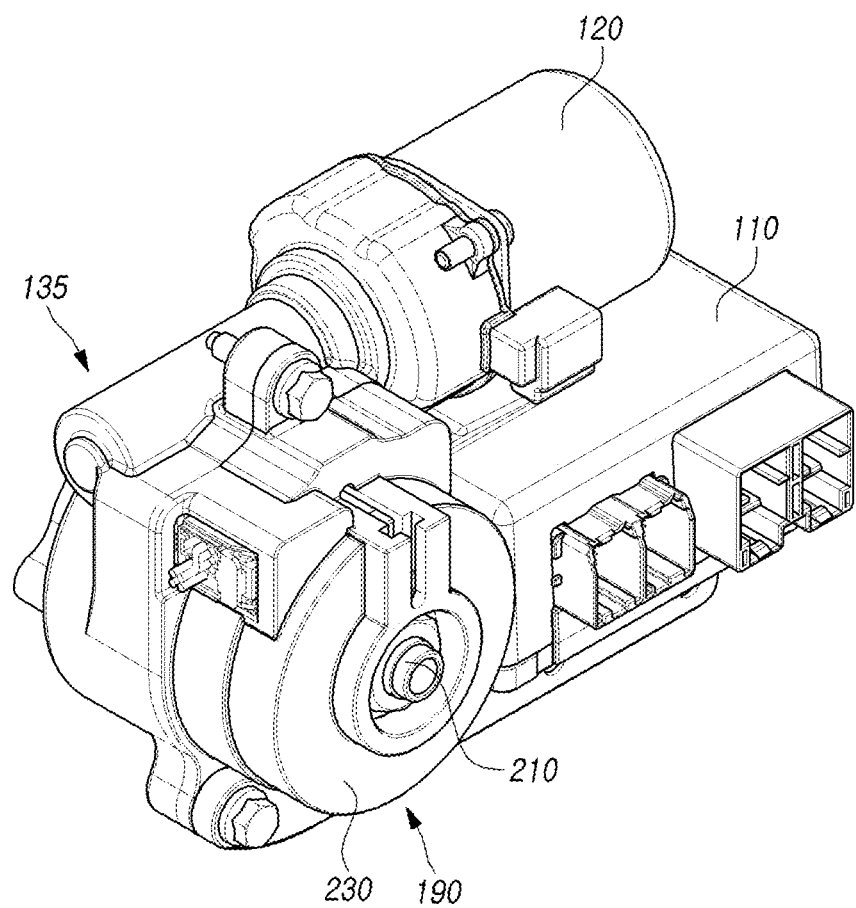
FIGS. 2 to 4 are perspective views illustrating a steer by wire type steering apparatus according to the embodiments of the present disclosure.
Figure 3:
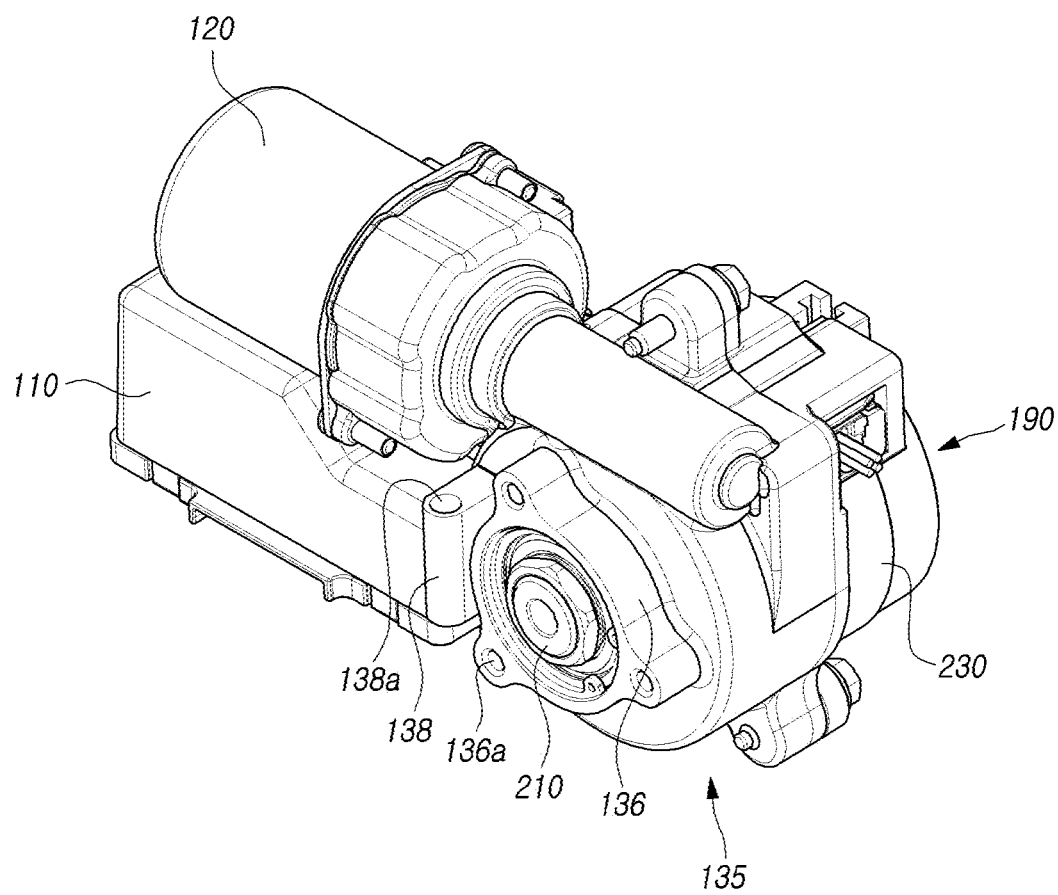
Figure 4:
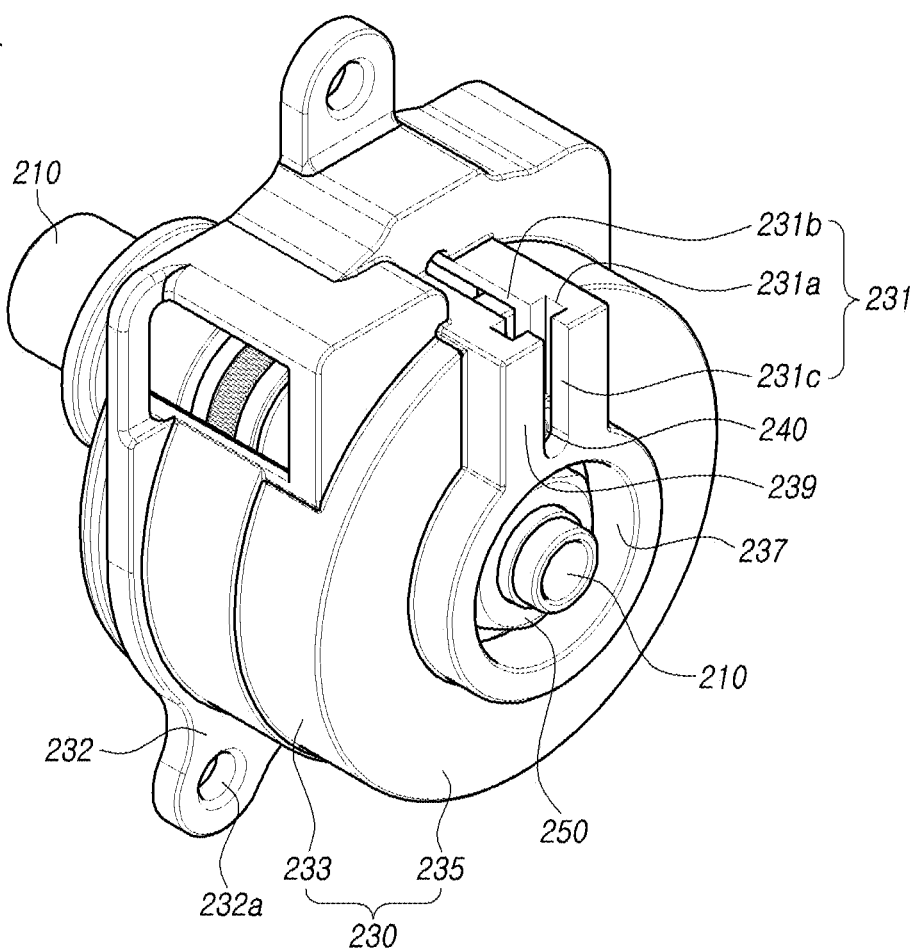
Figure 5:
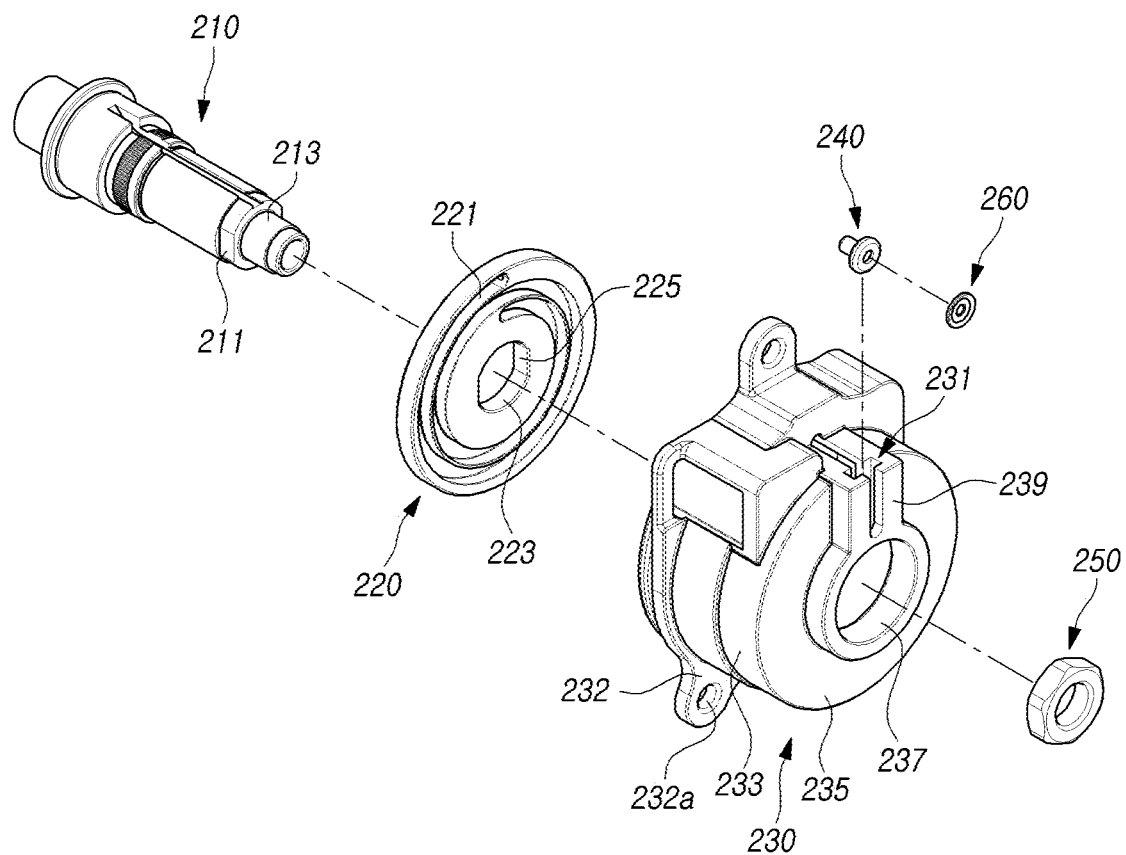
FIGS. 5 to 7 are exploded perspective views illustrating a steer by wire type steering apparatus according to the embodiments of the present disclosure.
Figure 6:
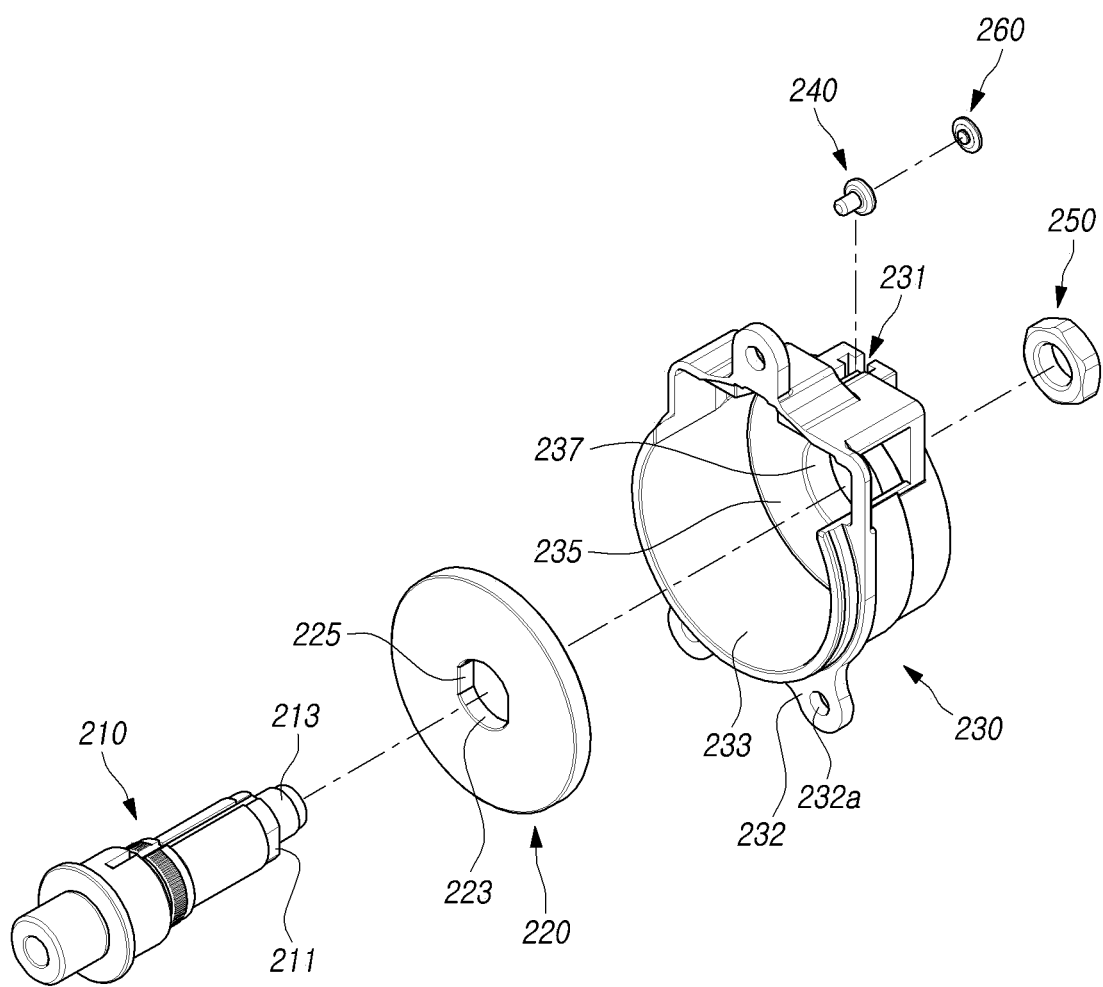
Figure 7:
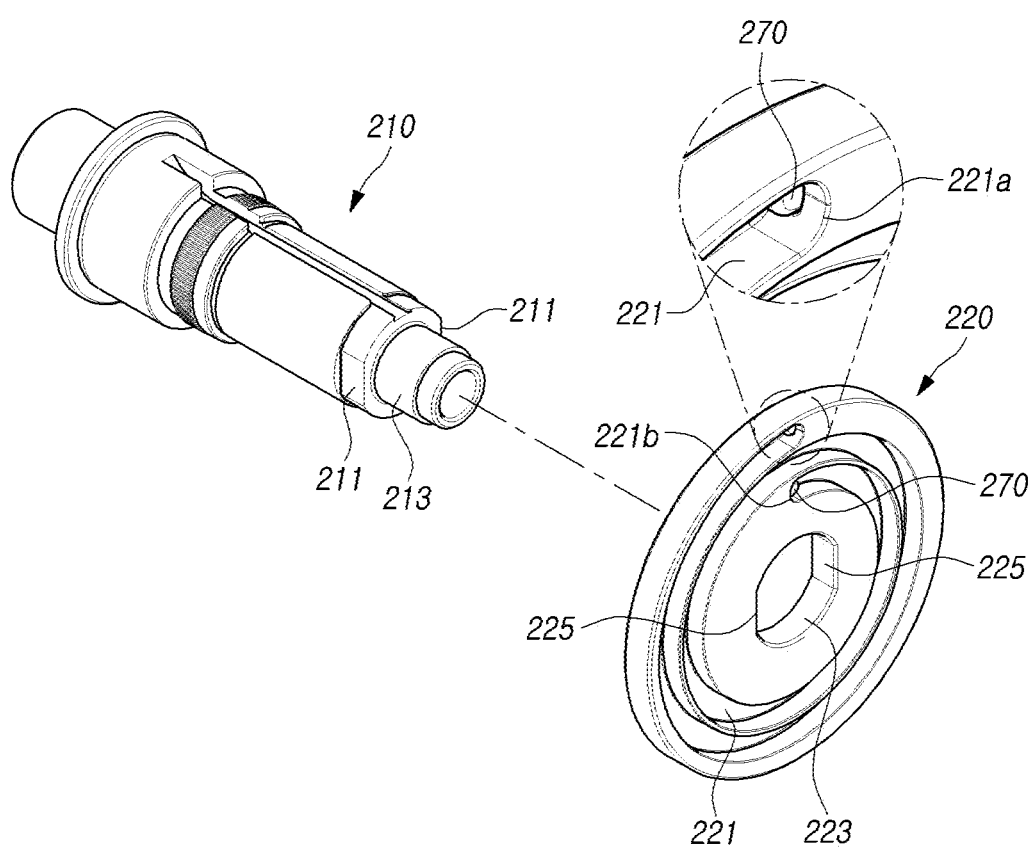
Figure 8:
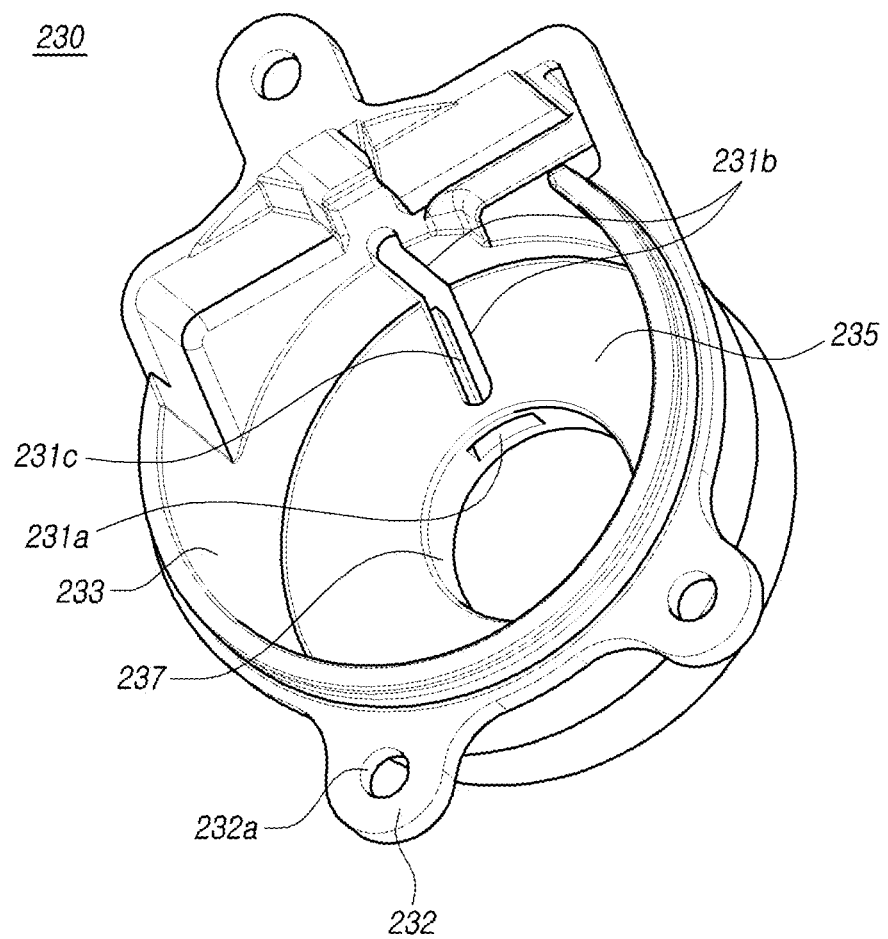
FIG. 8 is a perspective view illustrating a steer by wire type steering apparatus according to the embodiments of the present disclosure.
Figure 9:
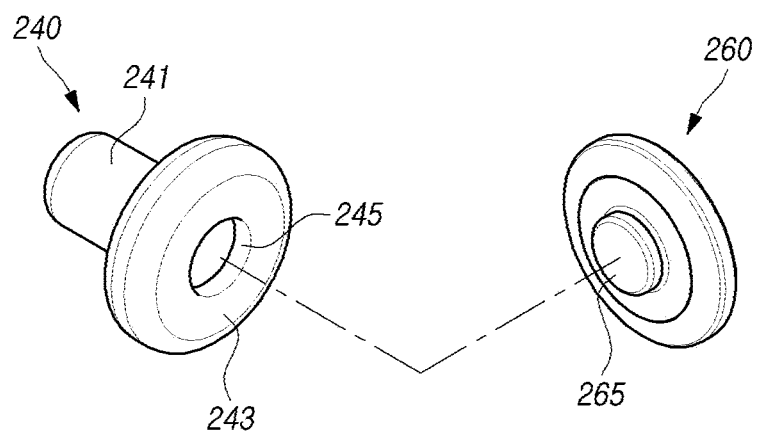
FIG. 9 is an exploded perspective view illustrating a steer by wire type steering apparatus according to the embodiments of the present disclosure.
Figure 10:
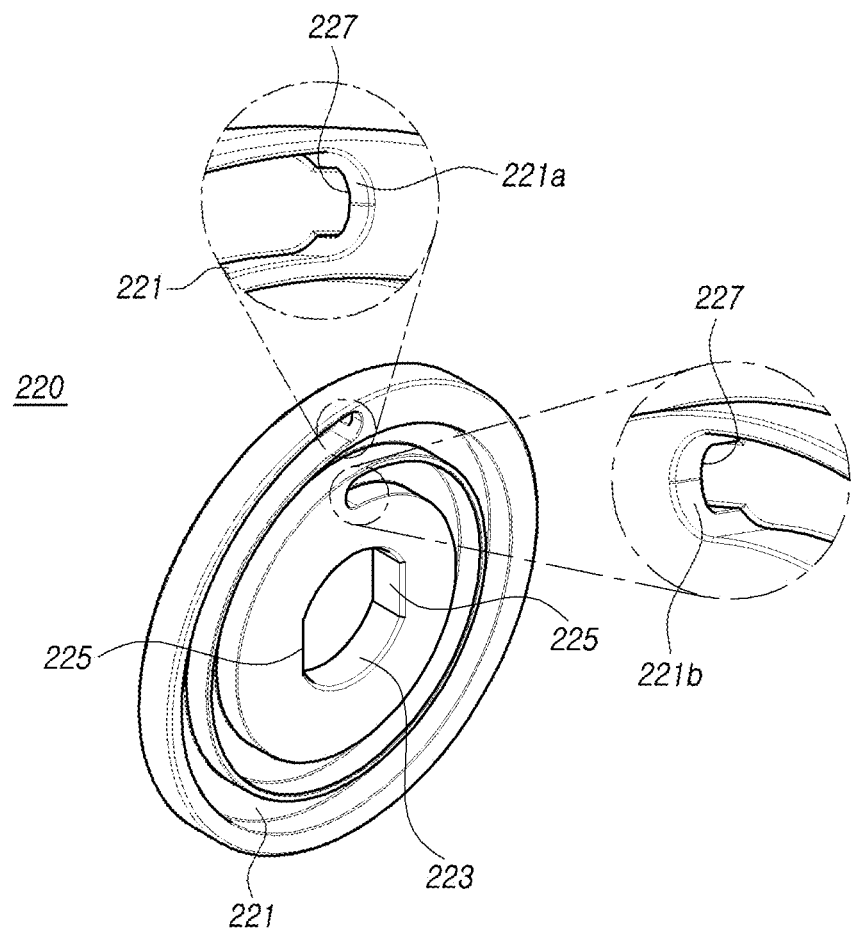
FIG. 10 is a perspective view illustrating a steer by wire type steering apparatus according to the embodiments of the present disclosure.
Figure 11:
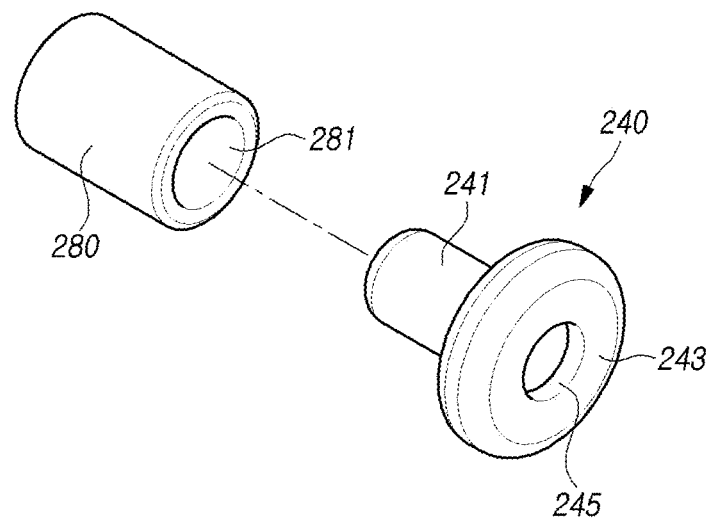
FIG. 11 is an exploded perspective view illustrating a steer by wire type steering apparatus according to the embodiments of the present disclosure.
Figure 12:
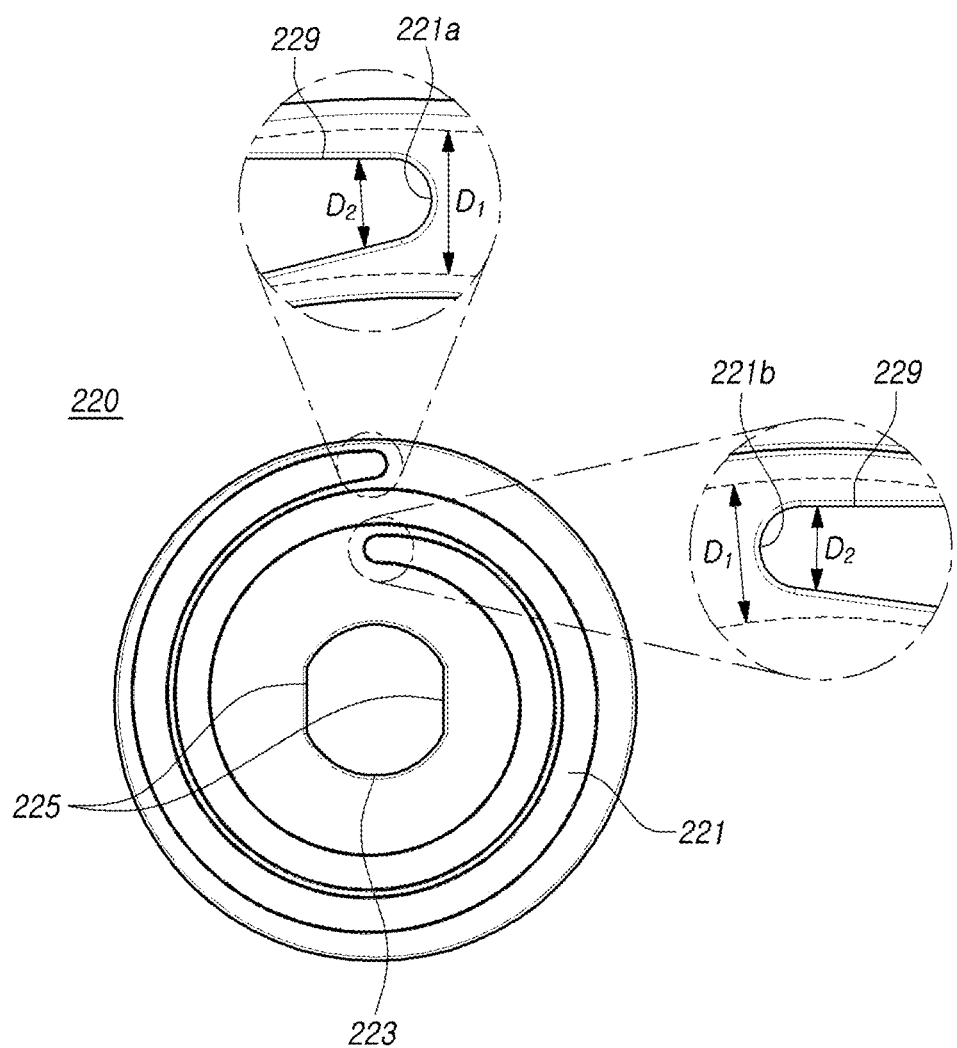
FIG. 12 is a front view illustrating a steer by wire type steering apparatus according to the embodiments of the present disclosure.

FIG. 1 is a schematic view illustrating a steer by wire type steering apparatus according to the embodiments of the present disclosure, FIGS. 2 to 4 are perspective views illustrating a steer by wire type steering apparatus according to the embodiments of the present disclosure, FIGS. 5 to 7 are exploded perspective views illustrating a steer by wire type steering apparatus according to the embodiments of the present disclosure, FIG. 8 is a perspective view illustrating a steer by wire type steering apparatus according to the embodiments of the present disclosure, FIG. 9 is an exploded perspective view illustrating a steer by wire type steering apparatus according to the embodiments of the present disclosure, FIG. 10 is a perspective view illustrating a steer by wire type steering apparatus according to the embodiments of the present disclosure, FIG. 11 is an exploded perspective view illustrating a steer by wire type steering apparatus according to the embodiments of the present disclosure, FIG. 12 is a front view illustrating a steer by wire type steering apparatus according to the embodiments of the present disclosure.

Referring to FIGS. 1 to 12, a steer by wire type steering apparatus according to the embodiments of the present disclosure may include a first guide member 210 formed in an axial shape, a second guide member 220 coupled to or integrally formed with the first guide member 210 and having a helical guide groove 221 that gradually decreases in diameter from the outer periphery to the center, a housing 230 in which the first guide member 210 and the second guide member 220 are built in, and a radial slot 231 is formed in a portion facing the guide groove 221, and a moving member 210 having one end supported by the slot 231 and the other end supported by the guide groove 221 and radially moving along the slot 231.

In the steer by wire type steering apparatus according to embodiments of the present disclosure, an angle sensor 105 and a torque sensor 107 that detect the driver's manipulation of the steering wheel 101 send electrical signals to the electronic control device 110 to operate the steering wheel motor 120 and the pinion shaft motor 130.

The electronic control device 110 controls the steering shaft motor 120 and the pinion shaft motor 130 based on the electrical signals transmitted from the angle sensor 105 and the torque sensor 107 and the electrical signals transmitted from other sensors mounted on the vehicle.

The steering shaft motor 120 is connected to a reducer 135 for reducing the number of revolutions of the motor, and provides a reaction force to the steering shaft 103 so as to feel a steering reaction force in the opposite direction when the driver operates the steering wheel 101 during normal driving. And during autonomous driving, steering is performed by the control of the electronic control device 110 without the driver's will.

The pinion shaft motor 130 slides the rack bar 111 connected to the pinion shaft 113 to steer the vehicle wheels 119 on both sides through the tie rod 115 and the knuckle arm 117.

However, in the drawings in the embodiments of the present disclosure, for convenience of explanation, the angle sensor 105 and the torque sensor 107, a vehicle speed sensor 104 for transmitting steering information to the electronic control device 110, and a wheel rotation angle sensor 106 are illustrated as an example, but a motor position sensor, various radars, lidar, and image sensors such as cameras may be provided, and a detailed description thereof will be omitted below.

In such a steer by wire type steering apparatus, since the steering wheel 101 and the vehicle wheel 119 are not mechanically connected, when the driver manipulates the steering wheel 101, a mechanical restriction is required to stop the rotation of the steering wheel 101 at a certain angle.

That is, when the rotation of the vehicle wheel 119 reaches the maximum point (in a general steering device, when the steering wheel 101 or the vehicle wheel 119 is in a full-turn state), the rotation angle limiting member 190 for mechanically limiting the rotation angle of the steering shaft 103 is provided so that the steering wheel 101 is not rotated any more. Thus, it provides the driver with an accurate steering feeling.

The rotation angle limiting member 190 may be coupled to a separate steering shaft coupled to the steering wheel 101 or directly coupled to the steering wheel 101 according to the assembly specifications of the vehicle. The rotation angle limiting member 190 includes the first guide member 210 formed in an axial shape, the second guide member 220 coupled to or integrally formed with the first guide member 210 and having the helical guide groove 221, the housing 230 having the radial slot 231 in a portion opposite to the guide groove 221, the moving member 240 is supported by the guide groove 221 and the slot 231 and moves radially along the slot 231.

The rotation angle limiting member 190 is operated to limit the rotation angle of the steering wheel 101 by rotating one of the first guide member 210 and the housing 230 and fixing the other one.

When the first guide member 210 rotates and the housing 230 is fixed, the housing 230 is fixed to the vehicle body and the first guide member 210 is connected to the steering shaft and rotates together. When the housing 230 rotates and the first guide member 210 is fixed, the first guide member 210 is fixed to the vehicle body, and the housing 230 is coupled to the steering wheel 101 and rotates together.

When the housing 230 is fixed, the first guide member 210 is connected to the steering shaft to rotate in conjunction with the steering wheel 101 and rotates the second guide member 220.

The housing 230 is fixed to the reducer 135 connected to the electronic control device 110 and the motor 120. The reducer 135 is provided with a vehicle body fixing portion 138 for coupling the housing 230 to the vehicle body, and a wheel coupling portion 136 for coupling to the steering wheel 101. Accordingly, the housing 230 may be coupled to the vehicle body or to the steering wheel 101 through a coupling hole 138a of the vehicle body fixing portion 138 and a coupling hole 136a of the wheel coupling portion 136.

The second guide member 220 is formed in a disk shape that rotates in conjunction with the first guide member 210, and may be coupled to the first guide member 210 or formed integrally.

When the second guide member 220 is coupled to the first guide member 210, a coupling hole 223 to which the first guide member 210 is coupled is provided in the center of the second guide member 220 and a helical guide groove 221 is formed on one side of the second guide member 220.

The guide groove 221 is formed on one side of the second guide member 220, and is formed in a spiral shape that gradually decreases in diameter toward the center.

The outer peripheral surface of the first guide member 210 is provided with at least one anti-slip portion 211 formed in a flat or curved surface recessed inward from the outer peripheral surface.

And, a coupling portion 225 formed in a flat or curved surface in close contact with the anti-slip portion 211 is provided on an inner circumferential surface of the coupling hole 223 of the second guide member 220.

The anti-slip portion 211 and the coupling portion 225 are not limited to the shape shown in the drawings, as long as they are closely coupled to each other to prevent slipping of the first guide member 210 and the second guide member 220.

The first guide member 210 has a screw portion 213 formed on the outer peripheral surface of the end penetrating the coupling hole 223 of the second guide member 220.

Accordingly, the first guide member 210 may be fixed to the second guide member 220 by a fastening member 250 coupled to the screw portion 213.

The housing 230 in which the first guide member 210 and the second guide member 220 are incorporated is coupled to the reducer 135 by a fastening member through a fastening hole 232a formed in the flange 232. The housing 230 includes a cylinder portion 233 formed in the axial direction of the first guide member 210, and a housing bulkhead 235 facing the second guide member 220.

A through hole 237 is formed in the housing bulkhead 235 so that the first guide member 210 passes through the through hole 237 and is coupled to the inside of the housing 230.

And, a slot 231 formed in a radial direction in the housing bulkhead 235 opposite to the guide groove 221 of the second guide member 220 is provided. One end of the moving member 240 is supported by the slot 231, and the other end is supported by the guide groove 221 to move radially along the slot 231.

In addition, the housing bulkhead 235 is provided with a protruding bulkhead 239 that protrudes in the axial direction and is connected to the cylinder portion 233, and the slot 231 may be provided in the protruding bulkhead 239.

Here, the slot 231 may include a first slot 231a disposed between the inner surface and the outer surface of the protruding bulkhead 239 and formed to be opened through the radially outer side of the protruding bulkhead 239 and the coupling hole 223, and a second slot 231b communicating with the first slot 231a and connected to the inner surface of the protruding bulkhead 239 and the cylinder portion 233.

The first slot 231a is disposed between the inner surface and the outer surface of the protruding bulkhead 239 and is formed long in the circumferential direction of the protruding bulkhead 239. The upper side of the first slot 231a is formed to be opened in the radial direction, and the lower side of the first slot 231a is formed to be opened through the coupling hole 223.

The second slot 231b is formed to pass through the inner surface of the protruding bulkhead 239, and the upper cylinder portion 233 is also formed to be opened in the axial direction.

Then, the moving member 240 may include a groove support portion 241 penetrating through the second slot 231b and inserted into the guide groove 221, and a slot support portion 243 extending radially from the groove support portion 241 and inserted into the first slot 231a.

Accordingly, when the second guide member 220 is rotated in association with the first guide member 210, a force is generated to rotate the groove support portion 241 in a helical direction while being supported by the guide groove 221. At the same time, since the slot support portion 243 is supported by the slot 231 and the rotation is limited, the moving member 240 is moved in the radial direction.

In addition, the groove support portion 241 is inserted into the second slot 231b formed to be opened in the cylinder portion 233 when the moving member 240 is assembled. At the same time, by inserting the slot support portion 243 into the first slot 231a, assembly is performed in the radial direction.

Here, the slot 231 may include a third slot 231c that communicates with the first slot 231a and is formed to be opened outwardly in the axial direction of the protruding bulkhead 239.

The third slot 231c is formed in communication with the first slot 231a with the axial direction outside of the protruding bulkhead 239 being opened. Then, the slot support portion 243 of the moving member 240 can be seen from the outside.

Therefore, it is possible to assemble by confirming that the position of the moving member 240 and the position of the guide groove 221 are the correct positions during assembly.

Meanwhile, a support member 260 may be coupled between the slot support portion 243 of the moving member 240 and the inner surface of the protruding bulkhead 239.

The support member 260 is elastically compressed and coupled between the slot support portion 243 and the protruding bulkhead 239 to support the moving member 240 in the guide groove 221 direction, so that noise due to the clearance between the moving member 240 and the housing 230 is prevented.

A fixing groove is formed on an outer surface of the slot support portion, and a fixing protrusion coupled to the fixing groove is formed on an inner surface of the support member. Accordingly, the support member 260 is coupled to the slot support portion 243 to be integrally assembled.

In addition, at least one of the one end 221a and the other end 221b of the guide groove 221 is provided with a damper 270 supported by the groove support portion 241 of the moving member 240 may be provided. In the drawings, the damper 270 is provided at both one end 221a and the other end 221b of the guide groove 221 as an example.

The damper 270 may be formed of at least one of elastic materials such as NR (Natural Rubber), BR (Butadiene Rubber), NBR (Nitrile Butadiene Rubber), CR (Chloroprene Rubber), EPDM(Ethylene Propylene Diene Monomer rubber), SBR (Styrene Butadine Rubber), CSM (Chlorosulphonated Polyethylene), fluororubber, silicone, urethane, thermoplastic polyurethane (TPU) etc which can be elastically compressed to absorb shock and noise.

In addition, the damper 270 may be formed of at least one of plastic materials such as polyacetal (POM), polyamide (PA), polycarbonate (PC), polyimide (PI), polybutylene terephthalate (PBT), polyethylene terephthalate (PET), etc, in order to absorb loads and vibrations together with rigidity capable of fixing the position of the damper 270.

When rotation of the first guide member 210 and the second guide member 220 in one direction and the other direction is restricted, the groove support portion 241 is supported by the damper 270 to absorb shock and prevent noise.

A fastening groove 227 to which the damper 270 is coupled is formed at the end of the guide groove 221, so that one side of the damper 270 is press-fitted into the fastening groove 227 and fixed.

In addition, the moving member 240 may be provided with a damping member 280 supported by the end of the guide groove 221 on the outer circumferential surface of the groove support portion 241.

The damping member 280 is formed in a cylindrical shape provided with an insertion hole 281 and is coupled to the outer circumferential surface of the groove support part 241, and may be formed of the same material as the damper 270 described above. The damping member 280 may be coated on the outer circumferential surface of the groove support part 241 to be integrally formed.

The diameter of the damping member 280 is formed to be equal to or smaller than the radial width D1 of the guide groove 221, so that the friction between the guide groove 221 and the damping member 280 is minimized and noise is not generated when the second guide member 220 rotates.

In addition, a narrow portion 229 whose width in the radial direction is gradually reduced is formed at one end 221a and the other end 221b of the guide groove 221. When the moving member 240 reaches both ends of the guide groove 221 due to the rotation of the second guide member 220, the amount of elastic compression of the damping member 280 is gradually increased, and the amount of impact and noise are reduced.

That is, the width D1 of the guide groove 221 is kept constant, and a narrow portion 229 that is gradually reduced in width at both ends 221a and 221b is provided. In the drawings of the embodiments of the present disclosure, the width D2 of the narrow portion 229 is reduced to be smaller than the width D1 of the middle portion.

On the other hand, when the first guide member 210 is fixed, the first guide member 210 is fixed to the vehicle body and is fixed together with the second guide member 220. The housing 230 is coupled to the steering wheel 101 and rotates together with the electronic control device 110, the motor 120, and the reducer 135. During this rotational movement, the moving member 240 radially moves along the slot 231, and the groove support portion 241 is supported by the end of the guide groove 221, thereby limiting the rotation of the steering wheel 101.

As described above, according to the embodiments of the present disclosure, there is provided a steer by wire type steering apparatus that increases a driver's steering feel and steering safety by preventing the steering wheel from mechanically rotating any more when the rotation of the vehicle wheel reaches the maximum point.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steer by wire type steering apparatus comprising:
a first guide member formed in an axial shape;
a second guide member coupled to or integrally formed with the first guide member and having a helical guide groove that gradually decreases in diameter from the outer periphery to the center;
a housing in which the first guide member and the second guide member are built in, and a radial slot is formed in a portion facing the guide groove; and
a moving member having one end supported by the slot and the other end supported by the guide groove and radially moving along the slot.

2. The steer by wire type steering apparatus of claim 1, wherein the second guide member is formed in a disk shape, and a coupling hole to which the first guide member is coupled is provided at a center thereof.

3. The steer by wire type steering apparatus of claim 2, wherein at least one anti-slip portion formed in a flat or curved surface recessed inward from the outer peripheral surface is provided on the outer peripheral surface of the first guide member.

4. The steer by wire type steering apparatus of claim 3, wherein a coupling portion formed in a flat or curved surface in close contact with the anti-slip portion is provided on an inner circumferential surface of the coupling hole of the second guide member.

5. The steer by wire type steering apparatus of claim 2, wherein a screw portion is formed on the outer peripheral surface of the end of the first guide member passing through the coupling hole of the second guide member.

6. The steer by wire type steering apparatus of claim 5, wherein the first guide member is fixed to the second guide member by a fastening member coupled to the screw portion.

7. The steer by wire type steering apparatus of claim 2, wherein the housing comprises:

a cylinder portion formed in the axial direction of the first guide member; and a housing bulkhead facing the surface on which the guide groove is formed of the second guide member.

8. The steer by wire type steering apparatus of claim 7, wherein a through hole through which the first guide member passes is provided in the housing bulkhead.

9. The steer by wire type steering apparatus of claim 8, wherein a protruding bulkhead protruding in the axial direction and connected to the cylinder portion is provided in the housing bulkhead.

10. The steer by wire type steering apparatus of claim 9, wherein the slot comprises:

a first slot disposed between the inner surface and the outer surface of the protruding bulkhead and formed to be opened through the radially outer side of the protruding bulkhead and the coupling hole; and a second slot communicating with the first slot and connected to the inner surface of the protruding bulkhead and the cylinder portion.

11. The steer by wire type steering apparatus of claim 10, wherein the moving member comprises:

a groove support portion penetrating through the second slot and inserted into the guide groove; and a slot support portion extending radially from the groove support portion and inserted into the first slot.

12. The steer by wire type steering apparatus of claim 10, wherein the slot includes a third slot that communicates with the first slot and is formed to be opened outwardly in the axial direction of the protruding bulkhead.

13. The steer by wire type steering apparatus of claim 12, wherein a support member is coupled between the slot support portion of the moving member and the inner surface of the protruding bulkhead.

14. The steer by wire type steering apparatus of claim 13, wherein the support member is elastically compressed and coupled between the slot support portion and the protruding bulkhead to support the moving member in the guide groove direction.

15. The steer by wire type steering apparatus of claim 13, wherein a fixing groove is formed on an outer surface of the slot support portion, and a fixing protrusion coupled to the fixing groove is formed on an inner surface of the support member.

16. The steer by wire type steering apparatus of claim 11, wherein at least one of the one end and the other end of the guide groove is provided with a damper supported by the groove support portion.

17. The steer by wire type steering apparatus of claim 16, wherein a fastening groove to which the damper is coupled is formed at an end of the guide groove.

18. The steer by wire type steering apparatus of claim 11, wherein a damping member supported by an end of the guide groove is provided on an outer circumferential surface of the groove support portion of the moving member.

19. The steer by wire type steering apparatus of claim 18, wherein a diameter of the damping member is equal to or smaller than a radial width of the guide groove.

20. The steer by wire type steering apparatus of claim 18, wherein a narrow portion whose width in the radial direction is gradually reduced is formed at one end and the other end of the guide groove.

* * * * *